United States Patent
Dolan, Jr. et al.

(10) Patent No.: US 7,119,977 B2
(45) Date of Patent: Oct. 10, 2006

(54) REDUCED RECOVERY TIME FOR PERPENDICULAR RECORDING SYSTEMS

(75) Inventors: Daniel J. Dolan, Jr., Cottage Grove, MN (US); James P. Howley, Broomfield, CO (US); Zachary Keirn, Loveland, CO (US); German Feyh, Boulder, CO (US); Michael P. Straub, Longmont, CO (US)

(73) Assignee: Agere Systems Inc., Allentown, PA (US)

( * ) Notice: Subject to any disclaimer, the term of this patent is extended or adjusted under 35 U.S.C. 154(b) by 5 days.

(21) Appl. No.: 11/091,352

(22) Filed: Mar. 28, 2005

(65) Prior Publication Data
US 2005/0232018 A1    Oct. 20, 2005

Related U.S. Application Data

(60) Provisional application No. 60/562,703, filed on Apr. 17, 2004.

(51) Int. Cl.
*G11B 5/02*    (2006.01)
(52) U.S. Cl. ...................................................... 360/67
(58) Field of Classification Search ..................... None
See application file for complete search history.

(56) References Cited

U.S. PATENT DOCUMENTS

| | | | |
|---|---|---|---|
| 6,133,784 A | 10/2000 | Gregoire | |
| 6,252,459 B1 | 6/2001 | Franck | |
| 6,404,578 B1 | 5/2002 | Bhandari et al. | |
| 2002/0034031 A1 | 3/2002 | Sakai | |
| 2003/0107831 A1* | 6/2003 | Erden et al. | 360/31 |

FOREIGN PATENT DOCUMENTS

| | | |
|---|---|---|
| EP | 1174874 A2 | 1/2002 |
| EP | 1205928 A2 | 5/2002 |

* cited by examiner

*Primary Examiner*—K Wong
*Assistant Examiner*—Mitchell Slavitt
(74) *Attorney, Agent, or Firm*—Kinney & Lange, PA (57) ABSTRACT

User data is read from a medium having servo data and user data encoded thereon. The user data is read with a read/write head that is operable in a write mode and a read mode. Servo data is read in a time window following a transition from write mode to read mode, with a frequency passband that has a first low frequency corner. User data is read from the medium after expiration of the time window, with a frequency passband that has a second low frequency corner that is lower than the first low frequency corner.

20 Claims, 6 Drawing Sheets

REDUCED RECOVERY TIME FOR PERPENDICULAR RECORDING SYSTEMS

CROSS-REFERENCE TO RELATED APPLICATION(S)

This application claims the benefit of Provisional Application No. 60/562,703 filed Apr. 17, 2004 for "Reduced Recovery Time for Perpendicular Recording Systems" by D. Dolan, Jr., J. Howley, Z. Keirn, G. Feyh and M. Straub.

INCORPORATION BY REFERENCE

The aforementioned Provisional Application No. 60/562,703 is hereby incorporated by reference in its entirety.

BACKGROUND OF THE INVENTION

The present invention relates to a system and method for reducing the recovery time required following transitions between write and read modes in a perpendicular recording disk drive system.

A hard disk drive (HDD) preamplifier has two primary modes, read mode and write mode. A critical and challenging specification for an HDD preamplifier is the time required to switch from the write mode to the read mode and to recover the reader output baseline. This write-to-read time is affected by transient signals injected into the preamplifier that come both internal and external sources. The effect of transient signals on the write-to-read time is greatest in perpendicular recording systems. Perpendicular recording systems require the ability to pass very low frequency data, which requires a reduction the preamplifier's low frequency corner from conventional longitudinal system requirements. A reduction in low frequency corner extends the amount of time needed to recover from transients. This increases the sensitivity to transients, which can increase the baseline wander and therefore the write-to-read recovery time. Baseline wander is also undesirable for the read channel data recovery system because it makes it more difficult for the variable gain amplifier (VGA) to track the servo data.

In the past, a great deal of effort has been focused on reducing transient injection from internal and external sources. Other attempts have tried to reduce the transients while still remaining hypersensitive to them. This creates unreasonable requirements on the system that creates the transients and adds risk due to system unknowns. Further improvements in dealing with transients would improve the state of the art.

BRIEF SUMMARY OF THE INVENTION

The present invention is a method and apparatus for reading user data from a medium having servo data and user data encoded thereon. The user data is read with a read/write head that is operable in a write mode and a read mode. Servo data is read in a time window following a transition from write mode to read mode, with a frequency passband that has a first low frequency corner. User data is read from the medium after expiration of the time window, with a frequency passband that has a second low frequency corner that is lower than the first low frequency corner.

DETAILED DESCRIPTION

Figure 1:
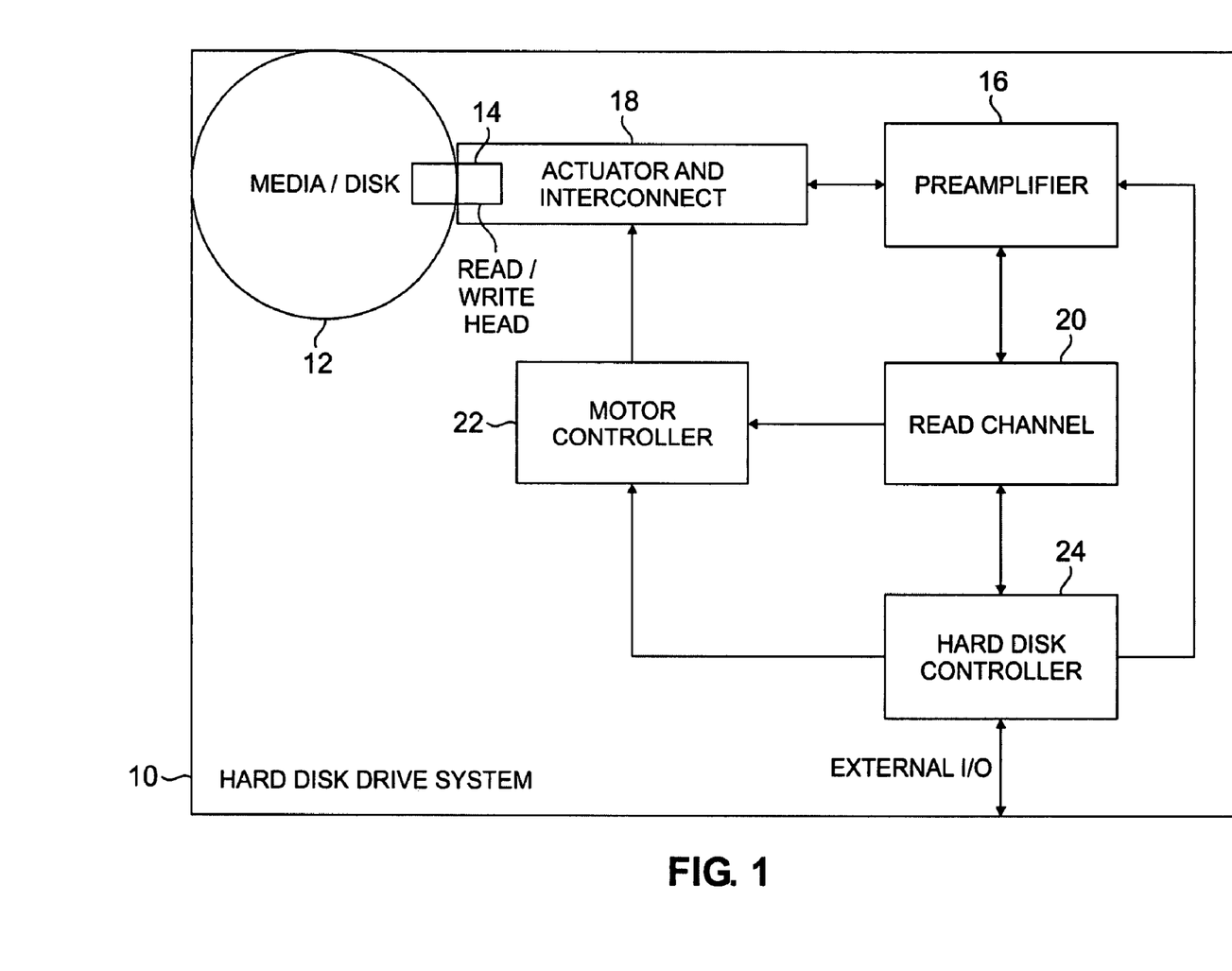
FIG. 1 is a block diagram of an exemplary hard disk drive (HDD) system.

FIG. 1 is a block diagram of exemplary hard disk drive (HDD) system 10. HDD system 10 includes media 12, read/write head(s) 14, preamplifier 16 connected to read/write head(s) 14 by actuator/interconnect 18, read channel 20, motor controller 22, and hard disk controller 24. Media 12 stores data in a non-volatile format, and typically takes the form of a rigid, rotatable magnetic or optical disk. Read/write head(s) 14 are used to recover (read) data from media 12 and to record (write) data to media 12. Preamplifier 16 is a circuit that amplifies the very low voltage signals obtained by read/write head(s) 14 in a read operation, and that converts the low voltage inputs from read channel 20 into high current signals for driving read/write head(s) 14 during a write operation. Read channel 20 detects and decodes signals received from preamplifier 16 obtained in a read operation, and encodes user data for preamplifier 16 that is to be written to media 12. Read channel 20 also includes a servo demodulation circuit that is used by motor controller 22 in a closed loop system to maintain read/write head(s) 14 centered over a desired track of media 12. Motor controller 22 is used to control actuator/interconnect 18 to position read/write head 14 over the desired track of media 12. Hard disk controller 24 controls and coordinates the operations of all of the components of HDD system 10.

Figure 2:
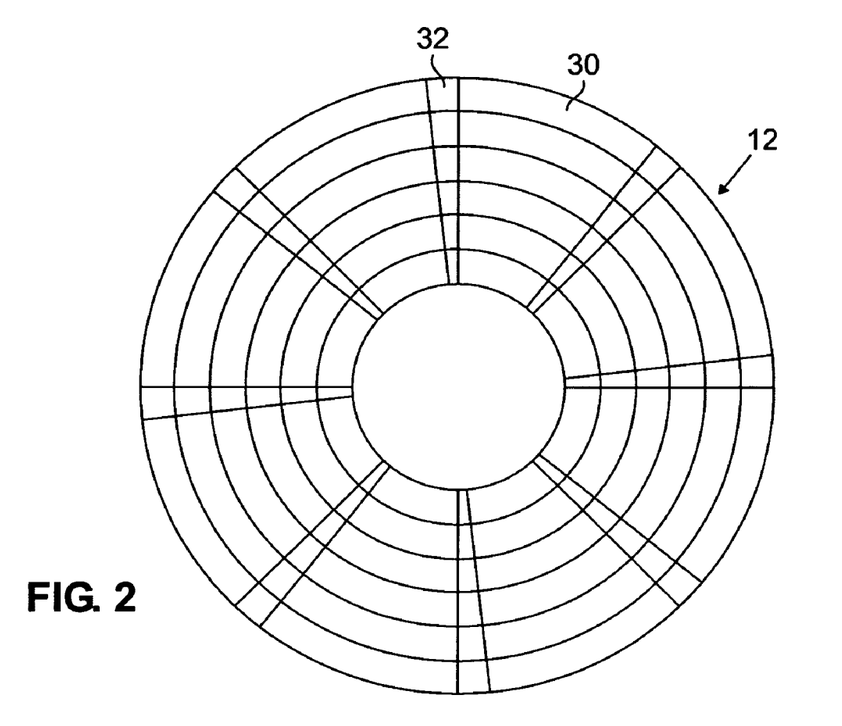
FIG. 2 is a diagram illustrating an exemplary configuration of a disk drive media, showing the division of the media into user data sectors and servo data sectors.

FIG. 2 is a diagram illustrating an exemplary configuration of media 12, showing the division of media 12 into user data sectors 30 and servo data sectors 32. Servo data sectors 32 are sometimes referred to in the art as servo wedges. The disk drive system utilizes the information stored in servo data sectors 32 to correctly position the read/write heads over a desired track of media 12. Therefore, servo information from servo data sectors 32 must be read before the data stored in user data sectors 30 can be recovered.

In existing longitudinal recording systems, servo data and user data each contain only relatively high frequency content. This fact allows preamplifier 16 (FIG. 1), to filter out low frequency signals with a relatively high low frequency corner (low frequency border of the filter passband), since neither the servo data nor the user data have meaningful low frequency content. A relatively high low frequency corner allows preamplifier 16 to recover quickly from a write-toread transition, as the higher frequency signals involved allow for faster response by the circuit.

For perpendicular recording systems, it is not possible for preamplifier 16 (FIG. 1) to have the same relatively high low frequency corner as was employed in longitudinal recording systems. The reason for this is that user data in a perpendicular recording system includes low frequency content that is important to improve the signal-to-noise ratio of the perpendicular recording system, which in turn improves the capacity of the system. As a result, preamplifier 16 is configured in perpendicular recording systems to pass low frequency content, meaning that the low frequency corner of the passband of preamplifier 16 is relatively low. This results in slower write-to-read recovery than was possible in a longitudinal recording system, as the lower frequency signals involved dictate slower response by the circuit.

Figure 3A:
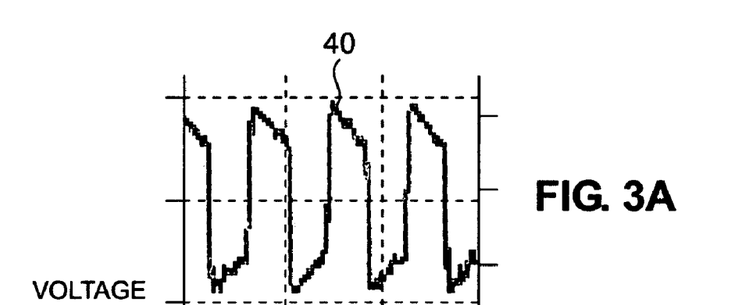
FIG. 3A shows a waveform illustrating an exemplary user data signal in a perpendicular recording system.
Figure 3B:
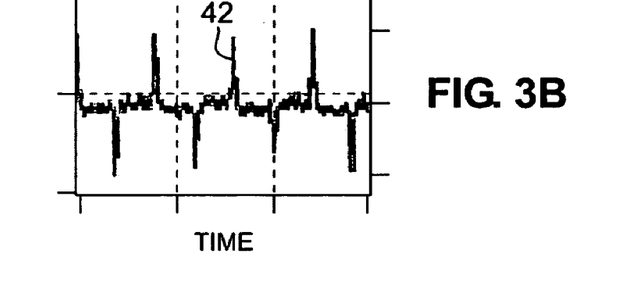
FIG. 3B shows a waveform illustrating an exemplary servo data signal in a perpendicular recording system.

FIG. 3A shows a waveform illustrating exemplary user data signal 40 in a perpendicular recording system, and FIG. 3B shows a waveform illustrating exemplary servo data signal 42 in a perpendicular recording system. User data signal 40 includes low frequency content, which is used by the read channel to improve the signal-to-noise ratio of the system. Servo data signal 42 is similar to servo data signals employed in longitudinal recording systems, and does not include meaningful low frequency content.

The present invention is based on the fact that perpendicular recording systems do not utilize any low frequency content of the servo data signal, and that at least one servo wedge must be read prior to reading user data. According to the present invention, the filtering performance of preamplifier 16 (FIG. 1) is controlled to have a relatively high low frequency corner immediately following a write-to-read transition (when servo data is being read), and to have a reduced low frequency corner after the servo data has been read, so that the low frequency content of the user data can be recovered and used appropriately.

Figure 4:
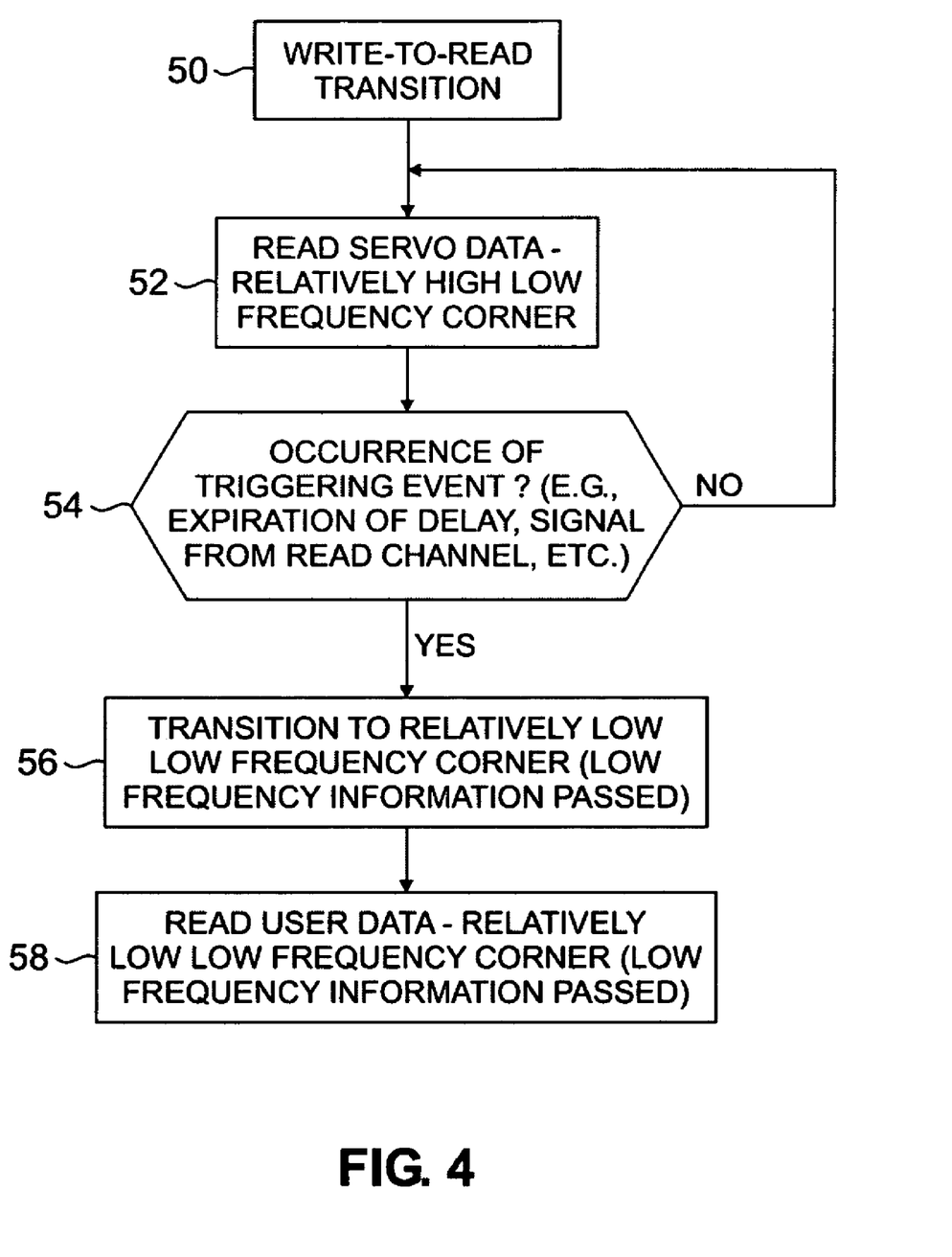
FIG. 4 is a flow diagram illustrating the performance of the filtering operation of preamplifier 16 (FIG. 1) in a perpendicular recording system according to the present invention.

FIG. 4 is a flow diagram illustrating the performance of the filtering operation of preamplifier 16 (FIG. 1) in a perpendicular recording system according to the present invention. A write-to-read transition occurs as indicated by box 50, meaning that servo and user data are to be read and the recovered signals are to be filtered by the preamplifier. Servo data is read first, as indicated by box 52, with the preamplifier filtering the data with a passband that has a relatively high low frequency corner, similar to the passband that was possible in preamplifier used for longitudinal recording. The relatively high low frequency corner of the preamplifier while servo data is being read is possible because the servo data does not have meaningful low frequency content, as described above with respect to FIG. 3B. The time following the write-to-read transition (box 50) is also the critical time for the preamplifier circuitry to recover from the transition, and using this time to read servo data with a relatively high low frequency corner results in faster recovery time following the transition than if the system performed a read operation with a lower low frequency corner (such as is required to read user data in a perpendicular recording system).

Servo data is read (box 52) with the relatively high low frequency corner until a triggering event occurs, as indicated by decision box 54. The triggering event signals that the recovery from the write-to-read transition is complete, and/ or that the reading of servo data is complete or near complete. The triggering event may be implemented in a number of different ways, such as by the expiration of a delay circuit signal or by the transition of a servo read signal from read channel circuitry, for example. Once the triggering even occurs, the preamplifier transitions to a relatively low low frequency corner, as indicated by box 56. Once the low frequency corner of the preamplifier has been transitioned to the lower frequency, user data is read with a relatively low low frequency corner as indicated by box 58, which is required in the perpendicular recording system to utilize the low frequency content of the user data signal, as described above with respect to FIG. 3A.

In an alternative embodiment, the transitioning of the low frequency corner from a relatively high frequency to a relatively low frequency can be done without waiting for the occurrence of a triggering event. In this embodiment, decision box 54 is eliminated. The rate of decrease of the low frequency corner is controlled so that, during the time immediately following the write-to-read transition (when servo data is being read), the low frequency corner is high enough to allow quick recovery from transient signals, and during a later time when user data is being read, the low frequency corner is low enough that the system is able to read the low frequency content that is present in the user data. This embodiment can be implemented with a relatively simple circuit, triggered only by a write-to-read transition, and may be advantageous in some applications.

Figure 5:
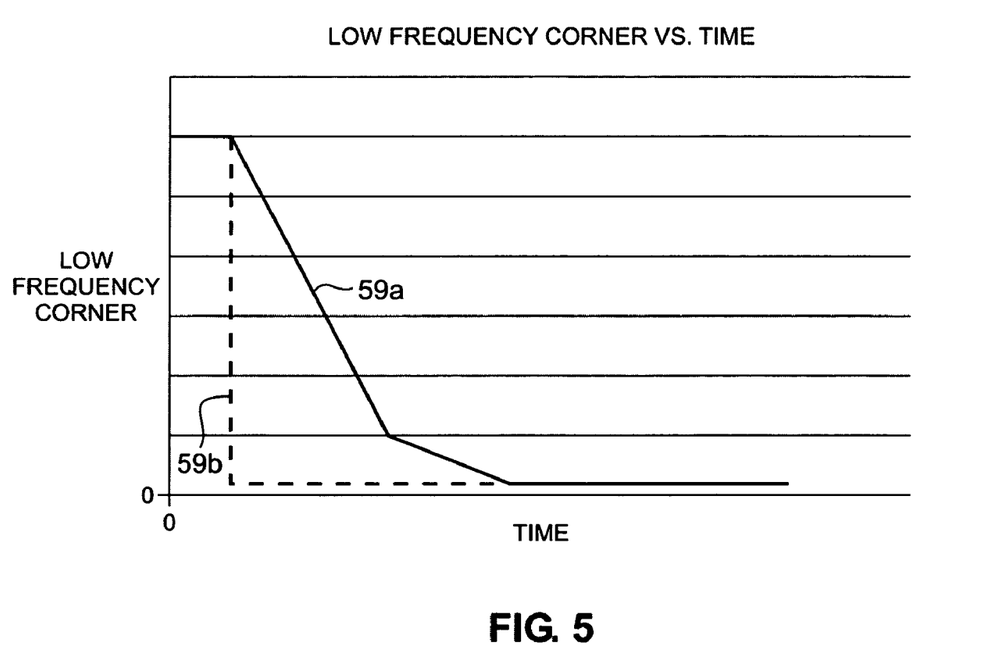
FIG. 5 is a graph illustrating an exemplary relationship between the low frequency corner of the preamplifier and time in accordance with the principles of the present invention.

FIG. 5 is a graph illustrating an exemplary relationship between the low frequency corner of preamplifier 16 (FIG. 1) and time in accordance with the principles of the present invention. The low frequency corner of the preamplifier is high during a servo read time following a write-to-read transition (shown as time 0 in FIG. 5), and then is reduced after the transition has occurred so that user data can be read in a manner that utilizes the low frequency content of the user data signal. In an exemplary embodiment, the relatively high low frequency corner (shown at time 0 in FIG. 5) is about 3 mega-Hertz (MHz) and the reduced low frequency corner is about 200 kilo-Hertz (kHz).

The transition between the higher low frequency corner (for reading servo data) and the lower low frequency corner (for reading user data) can be achieved in a number of different ways, and can be a slow, gradual transition (as shown by graph 59a) or may be one or more abrupt, stepwise transitions (shown by graph 59b). Abrupt transitions have the potential to inject disturbances into the signals obtained from the read head, but are quite simple to implement. Gradual transitions may have less effect on the read head signals, but usually require more complex circuitry to be employed, which increases the space required by the circuit and the cost of the circuit. Either type of transition may be used in accordance with the present invention.

Figure 6A:
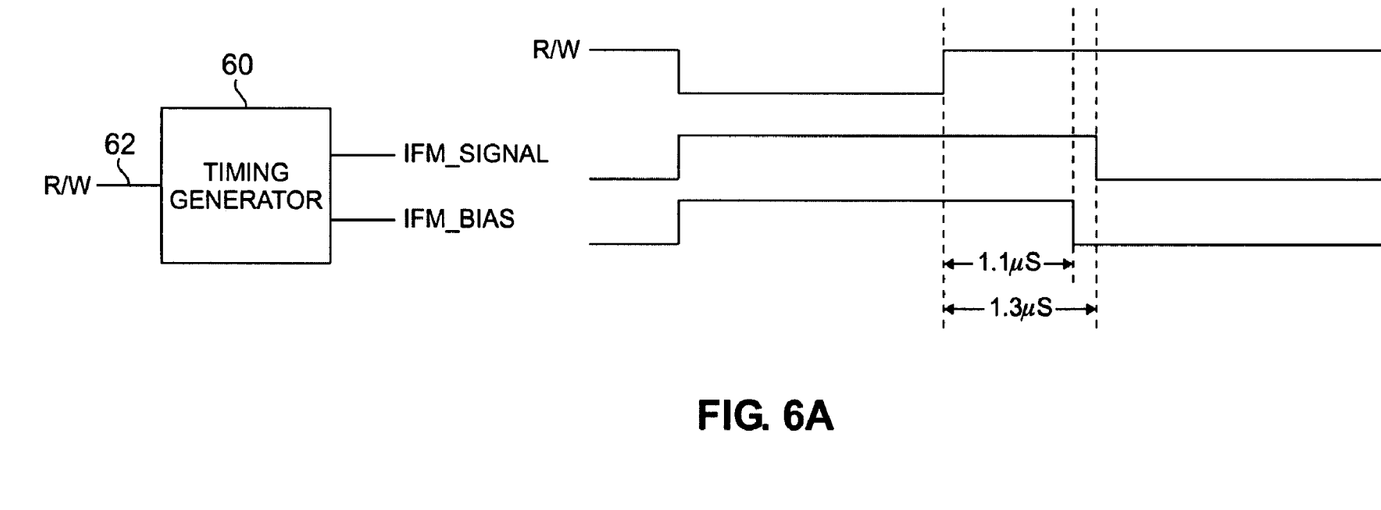
FIG. 6A is a diagram illustrating the timing of signals generated to control the reduction of the low frequency corner of the preamplifier passband.

FIG. 6A is a diagram illustrating the timing of signals generated to control the reduction of the low frequency corner of the preamplifier passband in one exemplary implementation of the present invention. Timing generator 60 receives read/write signal 62, which indicates whether the system is in write mode or read mode. Upon a transition from write mode to read mode, which is indicated by a change in the state of read/write signal 62, timing generator 60 implements a delay routine to trigger a transition in signals IFM_Bias and IFM_Signal. IFM_Bias has a state transition a first delay time after the write-to-read transition (indicated by a state transition of read/write signal 60), and IFM_Signal has a state transition a second delay time after the write-to-read transition. As mentioned above, in another embodiment, timing generator 60 may be configured to change the states of signals IFM_Bias and IFM_Signal based on receipt of a signal from the channel circuitry that indicates that servo data is no longer being read (and that user data is to be read).

Figure 6B:
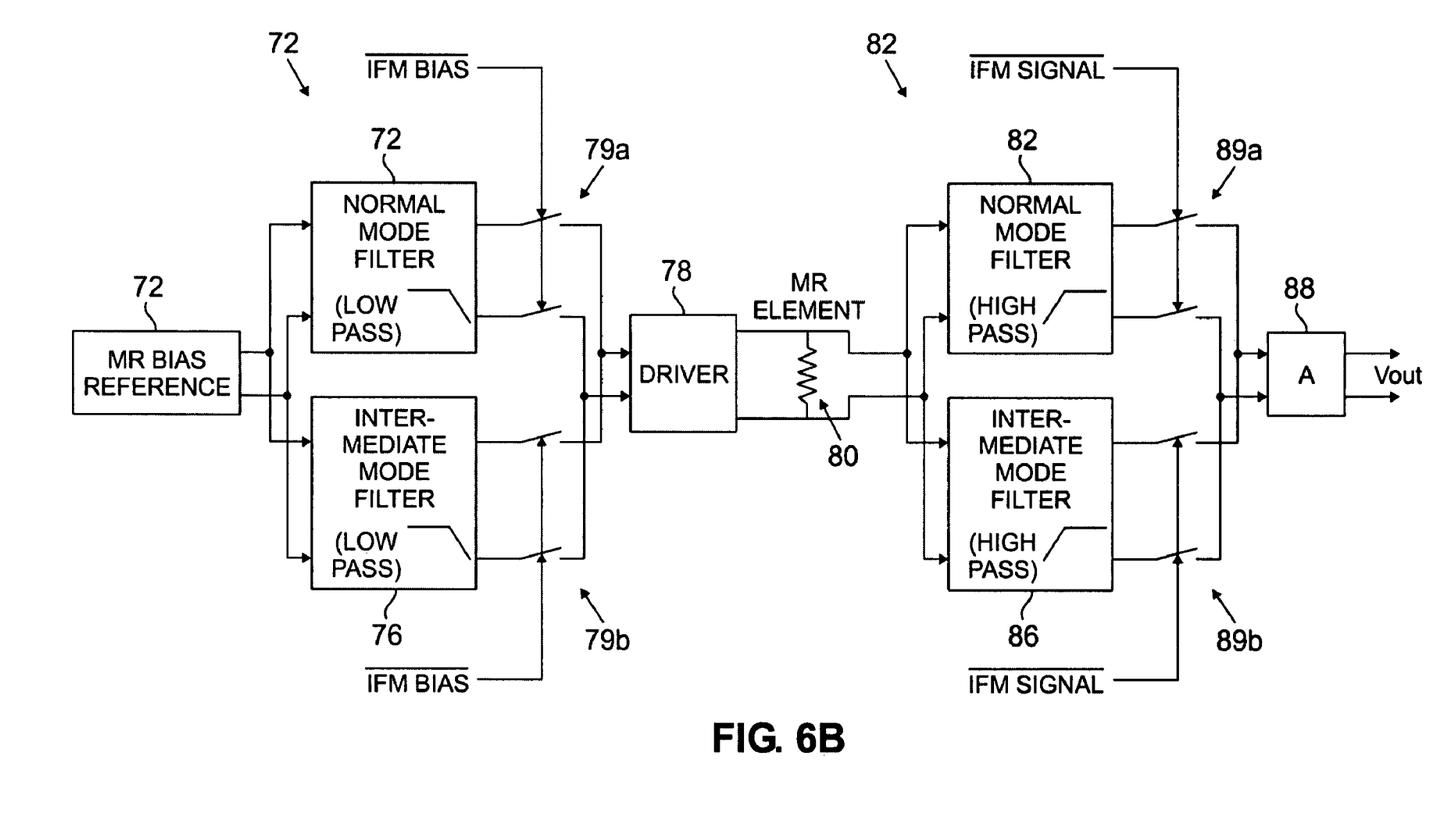
FIG. 6B is a diagram illustrating exemplary circuitry that is employed to transition the preamplifier from a relatively high low frequency corner immediately after a write-to-read transition occurs to a lower low frequency corner after a delay period following the write-to-read transition.

FIG. 6B is a diagram illustrating exemplary circuitry that is employed to transition the preamplifier from a relatively high low frequency corner immediately after a write-to-read transition occurs to a lower low frequency corner after a delay period following the write-to-read transition. Reference signals for biasing the read/write head are provided by MR Bias Reference circuit 70. The bias reference signals are connected through filter network 72, which includes normal mode low pass filter 74 and intermediate mode low pass filter 76, to driver circuit 78 which drives read/write head 80. Normal mode low pass filter 74 is connected (via switches 79*a*) when signal IFM_Bias is in a non-active state, and intermediate mode low pass filter 76 is connected (via switches 79*b*) when signal IFM_Bias is in an active state. Read/write head 80 is connected through filter network 82, which includes normal mode high pass filter 84 and intermediate mode high pass filter 86, to amplifier 88 whose output is the output signal (Vout) of the circuit. Normal mode high pass filter 84 is connected (via switches 89*a*) when signal IFM_Signal is in a non-active state, and intermediate mode high pass filter 86 is connected (via switches 89*b*) when signal IFM_Signal is in an active state.

In operation, upon occurrence of a write-to-read transition, both signal IFM_Bias and IFM_Signal are in an active state, as shown in FIG. 6A. The circuit shown in FIG. 6B therefore operates in an intermediate mode (with intermediate mode low pass filter 76 and intermediate mode high pass filter 86 connected). Intermediate mode low pass filter 76 passes low frequency signals up to a relatively high frequency, such as signals up to 300 KHz in an exemplary embodiment, to drive read/write head 80. Intermediate mode high pass filter passes high frequency signals from read/write head 80 that exceed a relatively high frequency, such as signals exceeding 3 MHz in an exemplary embodiment, for amplification by amplifier 88. Thus, in this intermediate mode, the response of the biasing portion of the circuit is made faster by the relatively high frequency passband of intermediate mode low pass filter 76, and only relatively high frequency signals obtained by read/write head 80 are passed by intermediate mode high pass filter 86. This operation is appropriate for the time following a write-to-read transition, because this is the time when only servo data is read, which has no useful low frequency content, meaning that no information is lost by passing only high frequency signals obtained from read/write head 80.

Some time after the write-to-read transition occurs (such as 1.1 micro-seconds (μs) in an exemplary embodiment), based on the fact that reading of servo data is over and reading of user data to commence, signal IFM_Bias changes to an inactive state (as shown in FIG. 6A). This causes normal mode low pass filter 74 to be connected, which passes low frequency signals up to only a relatively low frequency, such as signals up to 10 KHz in an exemplary embodiment, to driver circuit 78. A short time after signal IFM_Bias changes states, signal IFM_Signal also changes to an inactive state (as shown in FIG. 6A). This causes normal mode high pass filter 84 to be connected, which passes high frequency signals above a relatively low threshold frequency, such as 50 KHz in an exemplary embodiment, obtained from read/write head 80. Thus, in this normal mode, the low frequency signals obtained from read/write head 80 are passed to amplifier 88, which is appropriate for reading user data that (in a perpendicular recording system) includes useful low frequency content.

It should be understood that the embodiment described with respect to FIGS. 6A and 6B is presented as an example of one suitable implementation of the present invention. Other implementations are possible, including a configuration in which a gradual reduction of the low frequency corner is commenced immediately when a transition from write mode to read mode occurs. In this implementation, the low frequency corner transition is controlled so that, by the time user data is to be read, the low frequency corner is sufficiently low (such as 200 kHz or lower, for example) to allow the low frequency content of the user data to be read and accounted for.

The present invention, described above with respect to exemplary embodiments, provides reduced recovery time following a transition from write mode to read mode in a perpendicular recording system. This improvement is achieved by initially reading servo data following a transition from write mode to read mode with a relatively high low frequency corner, and then reading user data with a relatively low low frequency corner after the occurrence of a triggering event that indicates the closing of the servo data window. As a result, data is read with a high signal to noise ratio, and baseline wander in the read channel is reduced.

Although the present invention has been described with reference to preferred embodiments, workers skilled in the art will recognize that changes may be made in form and detail without departing from the spirit and scope of the invention. Particularly, while some forms of the invention are described in the form of discrete devices, it is recognized that the circuit is preferably reduced to practice in the form of an integrated circuit (IC). Therefore, terms such as "device" and the like should be construed in their broadest contexts to include portions of ICs that are conveniently described as functional components, as well as discrete devices. Likewise, some forms of the invention are described in terms of logical gates and chips that could also be implemented by discrete devices, all within the scope and spirit of the present invention.

The invention claimed is:

1. A method of reading user data with a read/write head that is operable in write mode and read mode from a medium having servo data and user data encoded thereon, the method comprising:
   reading servo data from the medium in a time window following a transition from write mode to read mode, the reading of servo data being performed with a first frequency passband that has a first low frequency corner; and
   reading user data from the medium after expiration of the time window, the reading of user data being performed with a second frequency passband that has a second low frequency corner that is lower than the first low frequency corner.

2. The method of claim 1, wherein expiration of the time window is signaled by a triggering event.

3. The method of claim 2, wherein the triggering event is the expiration of a time delay following the transition from write mode to read mode.

4. The method of claim 2, wherein the triggering event is a signal from a read channel indicating that user data is to be read.

5. The method of claim 2, further comprising:
   transitioning the first low frequency corner to the second low frequency corner in response to the triggering event in a gradual manner.

6. The method of claim 2, further comprising:
   transitioning the first low frequency corner to the second low frequency corner in response to the triggering event in a stepwise manner.

7. The method of claim 1, further comprising:
transitioning the first low frequency corner to the second low frequency corner following the transition from write mode to read mode in a gradual manner.

8. The method of claim 1, further comprising:
transitioning the first low frequency corner to the second low frequency corner following the transition from write mode to read mode in a stepwise manner.

9. The method of claim 1, wherein the second low frequency corner is no greater than about 200 kiloHertz.

10. A preamplifier circuit for use in a perpendicular recording system that includes a read/write head that is operable in write mode and read mode and a medium that includes servo data and user data encoded thereon, the preamplifier circuit being configured to control operations of the read/write head to:
read servo data from the medium in a time window following a transition from write mode to read mode, the reading of servo data being performed with a first frequency passband that has a first low frequency corner; and
read user data from the medium after expiration of the time window, the reading of user data being performed with a second frequency passband that has a second low frequency corner that is lower than the first low frequency corner.

11. The preamplifier circuit of claim 10, wherein expiration of the time window is signified by a triggering signal.

12. The preamplifier circuit of claim 11, wherein the triggering signal is generated a delay time after the transition from write mode to read mode.

13. The preamplifier circuit of claim 11, wherein the triggering signal is generated by a read channel coupled to the read/write head.

14. The preamplifier circuit of claim 11, including filtering circuitry operable to transition the first low frequency corner to the second low frequency corner in response to the triggering signal in a gradual manner.

15. The preamplifier circuit of claim 11, including filtering circuitry operable to transition the first low frequency corner to the second low frequency corner in response to the triggering signal in a stepwise manner.

16. The preamplifier circuit of claim 10, including filtering circuitry operable to transition the first low frequency corner to the second low frequency corner in a gradual manner.

17. The preamplifier circuit of claim 10, including filtering circuitry operable to transition the first low frequency corner to the second low frequency corner in response to the triggering signal in a stepwise manner.

18. The preamplifier circuit of claim 10, wherein the second low frequency corner is no greater than about 200 kiloHertz.

19. The preamplifier circuit of claim 10, realized as an integrated circuit (IC).

20. A perpendicular recording system comprising:
a read/write head that is operable in write mode and read mode;
a medium that includes servo data and user data encoded thereon; and
a preamplifier circuit operatively coupled to the read/write head, ht preamplifier circuit controlling operations of the read/write head to:
read servo data from the medium in a time window following a transition from write mode to read mode, the reading of servo data being performed with a first frequency passband that has a first low frequency corner; and
read user data from the medium after expiration of the time window, the reading of user data being performed with a second frequency passband that has a second low frequency corner that is lower than the first low frequency corner.

* * * * *

UNITED STATES PATENT AND TRADEMARK OFFICE
CERTIFICATE OF CORRECTION

PATENT NO.       : 7,119,977 B2                                        Page 1 of 1
APPLICATION NO.  : 11/091352
DATED            : October 10, 2006
INVENTOR(S)      : Daniel J. Dolan et al.

It is certified that error appears in the above-identified patent and that said Letters Patent is hereby corrected as shown below:

Column 2, Line 32, delete "anon-volatile", insert --a non-volatile--

Signed and Sealed this

Nineteenth Day of December, 2006

JON W. DUDAS
*Director of the United States Patent and Trademark Office*